Patented Aug. 2, 1949

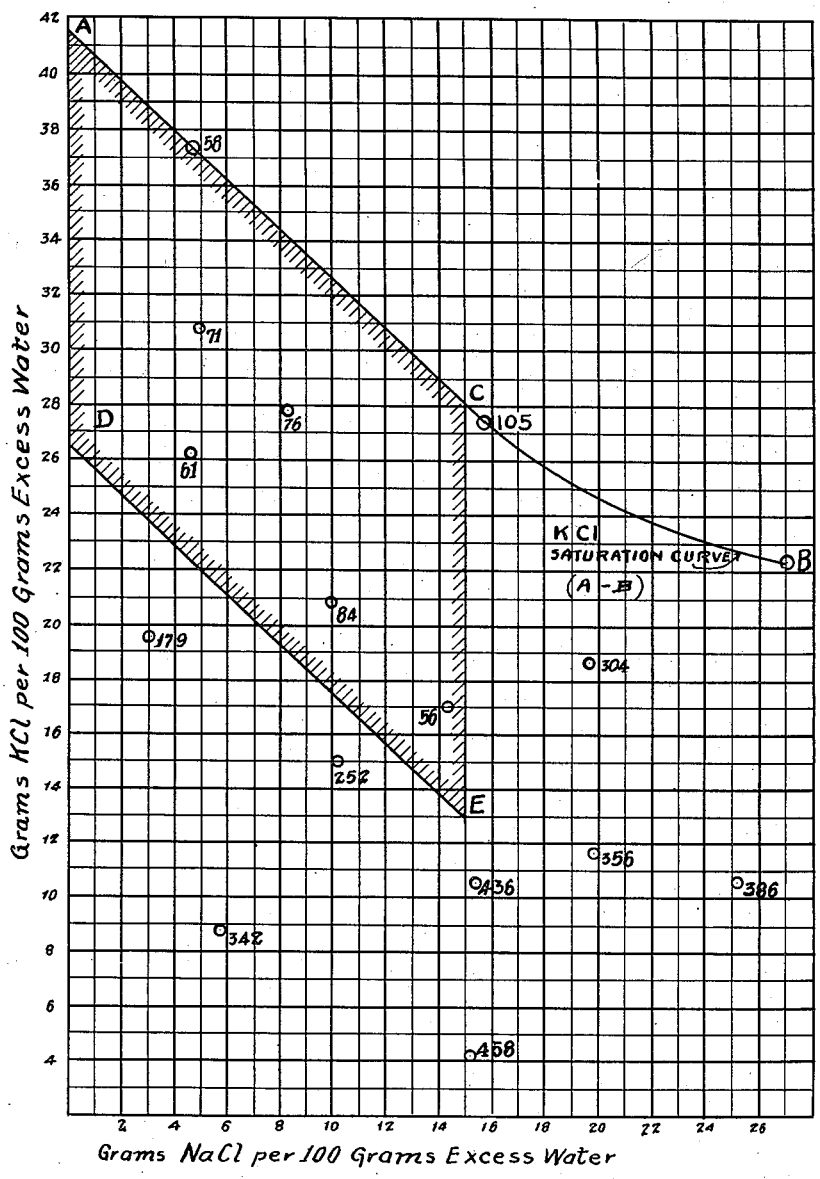

2,477,636

UNITED STATES PATENT OFFICE 2,477,636

PROCESS OF ABSORBING CARBON DIOXIDE FROM GASES

Frank Henderson May, Trona, Calif., assignor to American Potash & Chemical Corporation, Trona, Calif., a corporation of Delaware Application October 22, 1943, Serial No. 507,298

4 Claims. (Cl. 23—150)

This invention relates to a process of absorbing carbon dioxide from mixtures of carbon dioxide with other gases and subsequently recovering the carbon dioxide from the absorbing medium.

This application is a continuation-in-part of my copending application, Serial No. 462,425, filed October 17, 1942, now Patent No. 2,395,565.

The ordinary method of recovering carbon dioxide from gases is to contact the gases with an absorbing medium, usually containing sodium carbonate in solution, and then boiling the absorbing medium to expel the absorbed carbon dioxide therefrom.

An object of the present invention is to provide a process of producing carbon dioxide from gases by which the amount of carbon dioxide which may be recovered from the gases per gallon of absorbing medium used may be made large without necessitating the employment of high partial pressures of carbon dioxide in contact with the absorbing medium. By means of the present invention, I have been able to recover as high as 0.5 or more pounds of carbon dioxide per gallon of absorbing medium used, whereas with usual practice only about 0.1 pound of carbon dioxide per gallon of absorbing medium may be recovered.

A further object of the present invention is to provide a process of recovering carbon dioxide from gases, by which process I am enabled to reduce the amount of water vapor released from the absorbing medium during the steps of boiling off the carbon dioxide therefrom.

I have discovered that by employing an absorbing medium containing suitable concentrations of potassium and borate materials so as to cause potassium pentaborate to be precipitated from the absorbing medium during the absorption of carbon dioxide that the acidity of the absorbing medium may be maintained at a sufficiently low value to permit absorption of greatly increased quantities of carbon dioxide without increasing the partial pressure of carbon dioxide over that occurring in usual practice. I have further discovered that by retaining the precipitated potassium pentaborate in contact with the absorbing medium during subsequent boiling off or desorbing operations the liberation of the carbon dioxide from the absorbing medium may be greatly facilitated.

In accordance with the process of the present invention, the sludge or precipitated potassium pentaborate octohydrate and liquor is heated to boil off the absorbed carbon dioxide. During this operation, generally termed "desorption" in the art, the precipitated potassium pentaborate octohydrate goes back into solution, acidifying the solution and thereby materially aiding the liberation of the carbon dioxide. By the process of this invention, the carbon dioxide may be boiled off the absorbing medium while evaporating only one-fifth, or less, of the amount of water evaporated in usual practices.

An absorbing medium suitable for precipitating potassium pentaborate octohydrate during the absorption operation may consist of an aqueous solution containing only the elements or radicals, potassium, carbonate, and borate. Such an absorbing medium, however, has the disadvantage that it can be produced only through the use of chemicals, which at present can be provided only at a relatively high cost.

This invention is directed to a process utilizing an absorbing medium containing both sodium and chlorine as components of the system, as well as potassium, carbonate, borate, and water. Such a system has the advantage that a suitable absorbing liquor for the process may be formed employing potassium chloride, potassium pentaborate octohydrate, borax, sodium bicarbonate, and water, so that the absorbing medium may be provided at a relatively low cost. In fact, in many instances the absorbing medium may be made entirely from two cheap commercial articles of commerce: muriate of potash (KCl) and borax ($Na_2B_4O_7.10H_2O$). When these are partially dissolved and subjected to the action of carbon dioxide, the following reaction ensues:

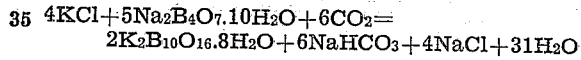

$$4KCl + 5Na_2B_4O_7.10H_2O + 6CO_2 = 2K_2B_{10}O_{16}.8H_2O + 6NaHCO_3 + 4NaCl + 31H_2O$$

Potassium pentaborate octohydrate is precipitated during such carbonation. Also, the system is generally sufficiently concentrated so that a certain quantity of sodium bicarbonate may be precipitated. The sodium chloride, however, remains entirely within the solution.

Not all aqueous solutions containing the elements or radicals, potassium, sodium, carbonate, borate, and chloride, are suitable absorbing media for obtaining the objects of the present invention, i. e., to permit large quantities of carbon dioxide to be absorbed per unit volume of absorbing medium without the development of high partial pressures of carbon dioxide over the absorbing medium. On the contrary, I have discovered that the partial pressure of carbon dioxide in contact with the absorbing medium rises very rapidly, unless the absorbing medium is maintained within the limits hereinafter described.

To describe the limits within which the absorbing medium must be maintained, it becomes necessary to define the language used in reporting the analysis of such absorbing medium. The absorbing medium is necessarily a very complex one. The elements of such absorbing medium may, in solution, form a very large number of different compounds, as well as undergo various forms of dissociation into ions. Chemical analysis of such a solution actually affords the chemist with the knowledge only of the quantities of the elements or radicals, potassium and sodium, chloride, borate, carbonate, and water present, together with the total alkali ($Na_2O$ and $K_2O$ to methyl red or other suitable indicator) combined with weak acids. In order that the significance of such an analysis may be readily understood, it is highly desirable that such analysis be reported as if the components of the solution were combined into various compounds which might be encountered in the process. There is present in the case of such a complex solution a considerable number of alternate bases upon which such a report might be made, and the selection of any system of reporting such analyses must, therefore, be to an extent arbitrary. I have found the following method of reporting the analysis of the absorbing medium used in the process of the present invention to afford a logical basis of describing the components of the absorbing medium.

Fundamentally, analytical procedures consist of: (1) making an "A" or acid titration (or titre), which measures the total alkali combined with the weak acids, i. e., $Na_2O$ and $K_2O$ as measured to the methyl red or methyl orange end point; (2) making a "B" titre, which measures the total borate, i. e., $B_2O_3$ as measured by the usual phenolphthalein-mannite end point; (3) making gravimetric determinations for $CO_2$, K and Cl. Sodium may also be determined gravimetrically.

Since sodium bicarbonate is the only carbonate compound usually precipitated in the process of the present invention, all of the $CO_2$ content of the absorbing medium is reported as sodium bicarbonate, $NaHCO_3$ (no sodium carbonate or potassium carbonate or bicarbonate being reported). The total borate content of the solution is then calculated (by use of the alkali determination or "A" titre, and the assumption that the $CO_2$ is all present as $NaHCO_3$) as tetraborate and pentaborate. The pentaborate is all reported as potassium pentaborate octohydrate, $K_2B_{10}O_{16}.8H_2O$ (since this is the pentaborate compound precipitated in the process, no sodium pentaborate being reported). The tetraborate content is then all reported as borax, $$Na_2B_4O_7.10H_2O$$

(no potassium tetraborate being reported), as borax is a solid phase encountered in the present system. The remaining potassium and the remaining sodium of the absorbing medium is then combined with the determined Cl, and reported as potassium chloride and sodium chloride, respectively. It would be possible that such an expression of analysis would show no "remaining sodium" and hence no NaCl present. And within the meaning of the terms herein used, it would be said that such an absorbing medium contained no sodium chloride. This would be true, despite the fact that the solutions were known to contain both sodium and chloride, and could be said to contain NaCl, were some other expression of the analysis chosen.

However, the process of the present application is interested in solutions which do show the presence of NaCl, when computed in accordance with the terminology employed in this application. Thus, the absorbing media of the present application are always reported as including the following components only:

Sodium bicarbonate ($NaHCO_3$)
Potassium pentaborate octohydrate ($K_2B_{10}O_{16}.8H_2O$)
Borax ($Na_2B_4O_7.10H_2O$)
Potassium chloride
Sodium chloride
Excess water It will be noted that in the foregoing method of reporting the analysis of the solution a part of the water of the solution is included in the compounds, and, therefore, the term "excess water" is used to describe the water in excess of the 8 mols of water present in the $K_2B_{10}O_{16}.2H_2O$ and the mols of water present in the compound $Na_2B_4O_7.10H_2O$. The analysis herein given is predicated upon the basis of a solution containing 100 grams of such excess water.

There are two methods of calculating the composition of the solution from the analysis determined. In accordance with ordinary technique, well-known to the chemist, the quantities of the following elements and radicals present in the solution may be determined. The quantity present of the element, sodium, might be determined, for example, by a gravimetric method, assuming that a chemist has determined that in the solution there are present the following:

| Elements or Radicals | Mols |
|---|---|
| K | A |
| Na | B |
| $CO_2$ | C |
| Cl | D |
| $B_2O_3$ | E |

The analysis of the solution in the form of the stated compounds is as follows:

| Compound | Mols |
|---|---|
| $NaHCO_3$ | C |
| $K_2B_{10}O_{16}.8H_2O$ | $E/3 - A/3 - B/3 + C/3 + D/3$ |
| $Na_2B_4O_7.10H_2O$ | $5A/6 + 5B/6 - 5C/6 - 5D/6 - E/3$ |
| KCl | $5A/3 + 2B/3 - 2C/3 - 2D/3 - 2E/3$ |
| NaCl | $-5A/3 - 2B/3 + 2C/3 + 5D/3 + 2E/3$ |

The titration method for determining the alkalies combined with the weak acids can be used in place of the gravimetric determination of the sodium content. Such a well known titration method tells the chemist the mols of K plus Na combined with the radicals $CO_2$ and $B_2O_3$, but does not include the K or Na combined with the Cl. The amount of K plus Na determined by this titration is equal, therefore, to:

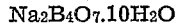

$$A+B-D$$

If we let this quantity ($A+B-D$) equal F, then the analysis is calculated as follows:

| Compound | Mols |
|---|---|
| $NaHCO_3$ | C |
| $K_2B_{10}O_{16}.8H_2O$ | $C/3 + E/3 - F/3$ |
| $Na_2B_4O_7.10H_2O$ | $-5C/6 - E/3 + 5F/6$ |
| KCl | $A - 2C/3 - 2E/3 + 2F/3$ |
| NaCl | $-A + 2C/3 + D + 2E/3 - 2F/3$ |

It is to be noted that the quantity B does not appear in the above table. The difficult sodium determination need not, therefore, be made by the chemist.

The above tables reduce to simple arithmetic the determination of the quantities and distribution of the salts present from the actual measurement of the elements and radicals present. It should be appreciated that all solutions containing the elements and radicals K, Na, $CO_2$, Cl, and $B_2O_3$ cannot be reported as containing the five salts listed in the above tables. Only such solutions as contain the elements and radicals in such proportion that every one of the mathematical expressions given above yield positive numerical values can be so reported. If the method of reporting the analyses herein described were applied to some solutions, such solutions would give negative values in accordance with the above formulas. This is true of the solutions described in my Patent Number 2,395,565 issued February 26, 1946.

The mols of excess water present is usually determined by the chemist by subtracting from the total weight of the solution the weight of the five salts as calculated. This calculated weight of salts would, of course, include the $H_2O$ in the $NaHCO_3$, the $K_2B_{10}O_{16}.8H_2O$, and the

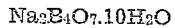
$Na_2B_4O_7.10H_2O$

The water content could be alternatively determined by a process of complete dehydration of the solution, of converting the loss in weight into mols of $H_2O$, and then of reporting excess water by subtracting from the total mols of water the mols of water present in the compounds

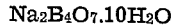
$Na_2B_4O_7.10H_2O$ and $K_2B_{10}O_{16}.8H_2O$.

While I have referred to the acid borate precipitated during the carbonation operation as potassium pentaborate octahydrate

$(K_2B_{10}O_{16}.8H_2O)$

I have occasionally encountered the formation and precipitation of other acid borates (more acid than $K_2B_4O_7$), about whose composition I know very little at this time. Potassium pentaborate ($K_2B_{10}O_{16}.8H_2O$) is the usual form precipitated, and is probably precipitated, at least in part, in all cases. Other acid borates sometimes, however, also precipitate. Such acid borates appear to be also quite insoluble at low carbonation temperatures and to readily dissolve at the higher boiling-off temperatures. Such other acid borates, therefore, behave in the same manner as the potassium pentaborate material and are, therefore, included herein as within the scope of my invention.

The present process, once inaugurated, is cyclic; carbon dioxide is absorbed from flue gases or the like, forming a sludge containing potassium pentaborate and a solution containing sodium chloride; the sludge is then heated to liberate $CO_2$ free of other fixed gases; the hot solution is then cooled and again employed as an absorption medium. A description of the process might start at any convenient point in the cycle—for example, with a fully carbonated sludge emerging from the absorbing operations. At that stage of operation, the absorbing medium consists of a sludge of precipitated potassium pentaborate octahydrate and sodium bicarbonate, and a liquid phase which is saturated with potassium pentaborate, saturated with sodium bicarbonate, and which also may be saturated or nearly saturated with borax. In addition thereto, the liquid phase of the absorbing medium contains both sodium chloride and potassium chloride, as above defined. The quantity of potassium chloride in the solution must be within 15 grams (per 100 grams of excess water) of the amount of potassium chloride necessary to saturate said solution at 35° C. with potassium chloride at the existing NaCl concentration. Said sodium chloride concentration must be more than 0 and not more than 15 grams of sodium chloride per 100 grams of excess water. I have made the discovery that, provided the absorbing medium at the end of the absorbing operations conforms with the foregoing requirements, the $CO_2$ partial pressure of the absorbing medium at 35° C. will be within the range of about 50 to 100 mm. Hg at 35° C.; if said limits be exceeded, excessive $CO_2$ partial pressures will result. The improved process of the present invention will be more fully understood by the following description of a number of specific examples of processes embodying the invention. The description is given in connection with the accompanying drawing. The drawing illustrates in diagrammatic form a part of my original solubility work leading to the present invention.

The diagram represents as much data as can be depicted on a plane figure, of a solubility system at 35° C., in which the solutions at all points illustrated on the diagram are saturated with the three solid phases, $K_2B_{10}O_{16}.8H_2O$, $NaHCO_3$, and $Na_2B_4O_7.10H_2O$. The ordinates represent the grams of potassium chloride present in said solution (per 100 grams of excess water), whereas the abscissa represent grams of sodium chloride present in said solution (per 100 grams of excess water). The line A—B represents the composition of all such solutions which are additionally saturated with potassium chloride (KCl). Point B represents a solution saturated with $K_2B_{10}O_{16}.8H_2O$, $Na_2B_4O_7.10H_2O$, $NaHCO_3$ and KCl which is additionally saturated with sodium chloride (NaCl). The points within the field, i. e., below the line A—B, are saturated with respect to the three solid phases, $K_2B_{10}O_{16}.8H_2O$, $NaHCO_3$, and $Na_2B_4O_7.10H_2O$ and are unsaturated with respect to NaCl and KCl, the contents of which latter part may be read from the coordinates.

This solubility chart represents the partial compositions of various absorber liquors, when such liquors (as sludges) emerge fully carbonated in the process of my invention. The partial pressures of carbon dioxide over the fully carbonated liquors of my invention vary according to changes in composition of said liquors. The points on the chart, Fig. 1, have been numbered to correspond with the $CO_2$ partial pressure exhibited (at 35° C.) by the various solutions. Thus, it may be seen that a solution saturated at 35° C. with respect to $K_2B_{10}O_{16}.8H_2O$, $NaHCO_3$, $Na_2B_4O_7.10H_2O$, and KCl, and containing 15.7 grams NaCl, exhibits a $CO_2$ partial pressure of 105 mm. Hg at 35° C. A point saturated with the first three, but containing only 10.5 grams KCl and 15.4 grams NaCl, exhibits a partial pressure of 436 mm., etc. In general, points having $CO_2$ partial pressures less than 100 mm. are the ones of interest to a commercial absorption system for the recovery of $CO_2$ from dilute gases, such as prepared flue gas.

On the drawing, the line D—E is a line parallel to the line A—C. The line D—E represents the composition of solutions having 15 grams (per 100 grams of excess water) less potassium chloride than otherwise comparable solutions saturated with potassium chloride. The line E—C is a vertical line representing the composition of solutions containing 15 grams of sodium chloride (per 100 grams of excess water), and the indicated quantities of KCl, while being, of course, simultaneously saturated with respect to $K_2B_{10}O_{16}.8H_2O$, $Na_2B_4O_7.10H_2O$ and $NaHCO_3$. An inspection of the foregoing diagram will show that the points enclosed within the parallelogram, indicated by the lines A—C—E—D—A, all exhibit partial pressures of carbon dioxide at 35° C. of less than 100 mm. of mercury, whereas all solutions corresponding to points outside of said area exhibit markedly higher partial pressures of carbon dioxide.

Accordingly, in the process of the present invention, the composition of the absorbing medium at the end of the carbonating operation is always within the parallelogram shown on the drawing as comprising the lines A—C—E—D—A.

I will now describe the first specific example of my process. Since the process is a cyclic one, the description may begin at any point in the cycle, and I commence the description with a statement of the composition of the sludge constituting the absorbing medium as obtained in the operation of the absorbing operation. Such a sludge, as obtained at 35° C. contained 16.8 grams of potassium pentaborate octohydrate ($K_2B_{10}O_{16}.8H_2O$) and 2.0 grams of sodium bicarbonate ($NaHCO_3$) as suspended solids per 100 grams of excess water in the accompanying solution. The solution composition plotted as point 58 on the drawing had the following composition at 35° C.:

| | |
|---|---|
| KCl | 37.3 |
| NaCl | 4.7 |
| $NaHCO_3$ | 8.1 |
| $Na_2B_4O_7.10H_2O$ | 24.2 |
| $K_2B_{10}O_{16}.8H_2O$ | 6.7 |
| $H_2O$ | 100.0 |

This solution was saturated with all of the solid phases reported in said analysis, with the exception of sodium chloride.

Such a sludge (solids and liquor) is then heated to liberate carbon dioxide. During the heating operation the suspended solids of the sludge dissolve easily, passing entirely into solution by the time the temperature of the solution reaches about 70–80° C. By so passing into solution the suspended potassium pentaborate acidifies the solution and causes the desired evolution of carbon dioxide therefrom. Heating during the desorption operations may be continued to various temperatures, depending on the desire of the operator, but in the example given I continue the desorption operation until the temperature reaches about 100° C. After the desorption operation the absorbing medium is cooled and then recarbonated until its composition attains the analysis previously given.

Compared with the processes in general use, the process of the present invention has several important advantages. The complete and easy solution of the precipitated absorber-sludge solids upon mild heating is of considerable practical importance. The desorber equipment may be made and operated in a simple fashion. Another outstanding advantage of the present system is the low heat, or steam, requirements necessary to liberate the carbon dioxide. As a test to illustrate this advantage of the process of the present invention, I have placed a sludge of the described composition in a flask fitted with a sealed agitator, a thermometer submerged in the liquid, and a connection leading to an off-side condenser. The lower end of the condenser was submerged in strong sulphuric acid provided for absorbing all water distilled from the flask during the liberation of the carbon dioxide. Upon heating the flask to liberate carbon dioxide and simulate the desorbing operation of a commercial plant, I found that all of the solids had dissolved when the solution had been heated to about 70° C. Brisk evolution of carbon dioxide began at about 60° C. The boiling was continued until the solution reached a temperature of 100° C., the solution being stirred the while. By carefully weighing the flask and water absorber, I obtained the results tabulated below:

| Temp. up to— | Percent of the $CO_2$ Expelled at 100° C. | Ratio $H_2O/CO_2$ by Weight |
|---|---|---|
| 75° C.[1] | 32 | 0.11 |
| 85° C. | 53 | 0.15 |
| 95° C. | 78 | 0.24 |
| 100° C. | 100 | 0.46 |

[1] All solids in solution at 69° C.

Following desorption, the liquor was cooled and returned to the absorption step. At 34° C. the cooled, partially supersaturated desorption liquor was found to have a $CO_2$ partial pressure of 38 mm. When employing this particular sludge in an established cycle, the yield of $CO_2$ per gallon of carbonator discharge sludge amounts to about 0.16 pound per gallon, when desorption is carried out at about 100° C.

The cyclic process just described may be commenced by adding to 88.8 parts (by weight) of water, 45.6 parts of potassium chloride, and 61.6 parts of borax. The resulting sludge is then carbonated until it has absorbed about 5.3 parts of carbon dioxide, by weight. The resulting sludge will have substantially the composition of the absorbing medium given at the start of the foregoing example, and is ready to pass to the desorbing operation for the recovery of carbon dioxide therefrom.

As a second example of the operation of the present improved process, I have chosen a case wherein even greater quantities of NaCl are generated, and also, at the same time, wherein some additional NaCl has been introduced into the cycle as an impurity with the reagents, borax and commercial muriate of potash. To start the cycle, I added to 77.6 parts by weight of water, 88.5 parts of borax ($Na_2B_4O_7.10H_2O$) and 34.0 parts of commercial KCl of 85.2 percent "purity." The impurity consisted solely of NaCl, representing 5.0 parts of NaCl. To start the cycle, that is, to prepare the sludge for the first desorption step of the cycle, I add 10.6 parts by weight of carbon dioxide, using flue gas, if desired.

It will be noted that a large volume of solid reagents is added to a relatively small volume of water. To assist in managing such a sludge, at the start of the cycle (at the "make-up"), I add all the KCl to the water, a part of the borax, and then begin adding $CO_2$. As the reaction takes place, water is liberated and the mixture becomes more fluid, at which time I may continue with the addition of the prescribed quantity of borax.

The fully carbonated sludge, prepared from the aforesaid raw materials, which sludge represents the fully carbonated sludge at the end of each subsequent carbonation operation of the cycle, now contains 16.5 parts of $NaHCO_3$ and 44.0 parts of $K_2B_{10}O_{16}.8H_2O$ as suspended solids, per 100 parts of excess water in the solution. The solution itself has the composition at 35° C.:

| | |
|---|---|
| KCl | 17.0 |
| NaCl | 14.4 |
| $NaHCO_3$ | 3.7 |
| $Na_2B_4O_7.10H_2O$ | 12.1 |
| $K_2B_{10}O_{16}.8H_2O$ | 2.9 |
| $H_2O$ | 100.0 |

This solution is saturated with respect to borax, sodium bicarbonate, and potassium pentaborate octohydrate. The partial pressure of $CO_2$ over this liquor (or what is the same thing, over this sludge) was found to be only 56 mm. Hg at 35° C.

According to my general scheme, this fully carbonated sludge which has just absorbed $CO_2$ from waste or dilute gas, such as flue gas, is now heated in a desorber to liberate $CO_2$ in a pure form—free of other contaminants, save some water vapor which is easily removed subsequently. In the process of my invention, the amount of water vapor so liberated with the evolved $CO_2$ is extremely low. As a corollary, the quantity of heat required for such desorption is far lower than is found in general practice. The foregoing sludge was placed in the same apparatus described above, and a "desorption" test conducted in the same manner. The results were as follows:

| Temp. up to— | Percent of the $CO_2$ Expelled at 100° C. | Ratio $H_2O/CO_2$ by Weight |
|---|---|---|
| 75° C.[1] | 60.0 | 0.08 |
| 95° C. | 85.9 | 0.10 |
| 100° C. | 100.0 | 0.27 |

[1] All solids in solution at 68° C.

Following this desorption, the liquor is cooled and returned to the absorption step to extract further quantities of $CO_2$ from flue gas, or the like. At 50° C. the cooled partially super saturated desorption liquor was found to have a $CO_2$ partial pressure of 29 mm. Hg. When employing this sludge in an established cycle, the yield of $CO_2$ per gallon of carbonator discharge sludge (fully carbonated sludge) is about 0.55 pound per gallon, when the desorption is carried out at 100° C.

While other examples of my present invention might be given, it should be obvious that the novelty described is real and valuable from a practical standpoint. The fact that unexpectedly low $CO_2$ partial pressures over the fully carbonated sludges occur within the limited field named in this application has also been demonstrated. Other points of utility having low partial pressures, while containing large quanties of dissolved NaCl, are: point 61, which shows a partial pressure of only 61 mm. Hg at 35° C., point 76 with a partial pressure of 76 mm., and 84 showing 84 mm. All of these solutions represent fully carbonated liquors (or sludges) being saturated with respect to $NaHCO_3$, $K_2B_{10}O_{16}.8H_2O$, and borax, and contain the indicated unsaturation values with respect to NaCl and KCl.

In summary, the practical field of usefulness of the process of the present invention resides in solutions saturated (when completely carbonated) with respect to borax, sodium bicarbonate, and potassium pentaborate octohydrate, while containing more than 0 and not more than 15 grams of NaCl in solution, and while ranging from saturation with respect to KCl to 15 grams under saturation with respect to KCl at any given NaCl content within the aforesaid limits.

While the quantity of the borax present in the liquid phase of the absorbing medium at the end of the absorbing operation was in the instant examples given just sufficient to saturate the liquid phase with borax, one may use either more or slightly less borax, as required for saturation, without substantially altering the results of the process.

This invention is an improvement upon my copending application Serial 460,278, filed September 30, 1942, issued as Patent Number 2,395,564, and describes an absorption and desorption process in which potassium pentaborate octohydrate is precipitated in the absorption operation and redissolved in the desorption operation. The process of the present invention differs from that of said application 460,278 in that the solutions undergoing treatment in the process contain chlorides, whereas no chlorides are included in the solutions described in application 460,278.

In my copending application Serial No. 462,425, filed October 17, 1942, issued as Patent Number 2,395,565, I have likewise described a process in which potassium pentaborate octohydrate is precipitated in the absorption operation and redissolved in the desorption operation.

The solutions employed in the process of said latter copending application cannot be calculated to the five components potassium chloride, sodium chloride, sodium bicarbonate, borax, and potassium pentaborate octohydrate and it represents, therefore, solutions outside of the scope of the present application.

In my copending application Serial No. 466,675, filed November 23, 1942, issued as Patent Number 2,374,876, I have also described a process of extracting carbon dioxide from gases, but in the process of said latter copending application, no sodium compounds are present in the solutions undergoing treatment and therefore the solutions of such process do not come within the scope of the present case.

In my copending application Serial No. 507,299, filed October 22, 1943, issued as Patent Number 2,395,566, I have described a process in which pure potassium pentaborate octohydrate is produced, which process is not herein described or claimed, but is reserved for said copending application.

In my copending application Serial No. 507,300, filed October 22, 1943, issued as Patent Number 2,374,877, I have described the process of producing a mixture of sodium bicarbonate and potassium pentaborate octohydrate. These steps are not claimed per se herein, apart from the combined process including the absorption step but are reserved to be claimed in said copending application 507,300.

While the particular forms of the process herein described are well adapted to carry out the objects of the invention, it is to be understood that the invention is not limited to the specific examples given, but is of the scope set forth in the appended claims.

I claim:

1. A process of recovering carbon dioxide from gases, which includes heating a sludge to evolve carbon dioxide, the solid phase of which sludge before heating consisting of potassium pentaborate octohydrate and sodium bicarbonate, the liquid phase of which sludge before heating consisting of an aqueous solution containing the radicals potassium, sodium, chloride, tetraborate, pentaborate, and bicarbonate, said solution being saturated with potassium pentaborate octohydrate, and sodium bicarbonate, and substantially saturated with borax, the composition of said solution when calculated in the form of the following five salts only, potassium chloride, sodium chloride, sodium bicarbonate, borax, potassium pentaborate octohydrate containing sodium chloride but less than 15 grams of sodium chloride per 100 grams of excess water over that water included in the calculated salts, and containing an amount of KCl between an upper limit of the amount necessary to saturate said solution at 35° C. and a lower limit of 15 grams per 100 grams of excess water less than said upper limit, after evolution of carbon dioxide cooling the resulting solution, and absorbing carbon dioxide from gases with said resulting solution to form the aforesaid sludge.

2. A process of recovering carbon dioxide from gases, which includes heating a sludge to evolve carbon dioxide, the solid phase of which sludge before heating consisting of potassium pentaborate octohydrate and sodium bicarbonate, the liquid phase of which sludge before heating consisting of an aqueous solution containing the radicals potassium, sodium, chloride, tetraborate, pentaborate, and bicarbonate, said solution being saturated with potassium pentaborate octohydrate, and sodium bicarbonate, and substantially saturated with borax, the composition of said solution when calculated in the form of the following five salts only, potassium chloride, sodium chloride, sodium bicarbonate, borax, potassium pentaborate octohydrate containing sodium chloride but less than 15 grams of sodium chloride per 100 grams of excess water over that water included in the calculated salts, and containing an amount of KCl between an upper limit of the amount necessary to saturate said solution at 35° C. and a lower limit of 15 grams per 100 grams of excess water less than said upper limit, after evolution of carbon dioxide cooling the resulting solution, and absorbing carbon dioxide from gases with said resulting solution to form the aforesaid sludge, said sludge having a partial pressure of carbon dioxide of less than 100 mm. Hg at 35° C.

3. A process of recovering carbon dioxide from gases, which includes heating a sludge to evolve absorbed carbon dioxide, the solid constituents of the sludge going into the solution during such heating, cooling the resulting solution, and absorbing carbon dioxide to re-form the aforementioned sludge, the solid phase of said sludge consisting of potassium pentaborate octohydrate and sodium bicarbonate, the liquid phase of said sludge when calculated to only the five salts potassium chloride, sodium chloride, sodium bicarbonate, borax, and potassium pentaborate octohydrate, containing sodium chloride but less than 15 grams of sodium chloride per 100 grams of excess water, the maximum KCl content of said solution decreasing with the increase of sodium chloride concentration between limits of 42 and 28 grams per 100 grams of excess water and the minimum concentrations of KCl decreasing with the increased sodium chloride concentrations between the limits of 27 and 13 grams of KCl per 100 grams of excess water.

4. A process of recovering carbon dioxide from gases, which includes heating a sludge to evolve carbon dioxide, the solid phase of which sludge before heating consisting of potassium pentaborate octohydrate and sodium bicarbonate, the liquid phase of which sludge before heating consisting of an aqueous solution containing the radicals potassium, sodium, chloride, tetraborate, pentaborate, and bicarbonate, said solution being saturated with potassium pentaborate octohydrate and sodium bicarbonate, and substantially saturated with borax, the composition of said solution when calculated in the form of the following five salts only, potassium chloride, sodium chloride, sodium bicarbonate, borax, potassium pentaborate octohydrate, containing sodium chloride, but less than 15 grams of sodium chloride per 100 grams of excess water over that water included in the calculated salts, and containing an amount of KCl between an upper limit of the amount necessary to saturate said solution at 35° C. and a lower limit of 15 grams per 100 grams of excess water less than said upper limit, after evolution of carbon dioxide cooling the resulting solution, and absorbing carbon dioxide from gases with said resulting solution to form the aforesaid sludge, said sludge having a partial pressure of carbon dioxide of between 50 and 100 mm. Hg at 35° C.

FRANK HENDERSON MAY.

REFERENCES CITED

The following references are of record in the file of this patent:

UNITED STATES PATENTS

| Number | Name | Date |
| --- | --- | --- |
| 1,619,336 | Drewsen | Mar. 1, 1927 |
| 1,864,068 | Jones | June 21, 1932 |
| 1,928,178 | Bragg | Aug. 29, 1933 |
| 2,205,962 | Reich | June 5, 1940 |
| 2,374,877 | May | Feb. 26, 1946 |
| 2,395,564 | May | Feb. 26, 1946 |
| 2,395,565 | May | Feb. 26, 1946 |
| 2,395,566 | May | Feb. 26, 1946 |
| 2,395,567 | May | Feb. 26, 1946 |